United States Patent
Hartmann

(10) Patent No.: US 11,140,204 B1
(45) Date of Patent: Oct. 5, 2021

(54) MEDIA DELIVERY NOTIFICATION DATA INGESTION AND DISPLAY

(71) Applicant: DISH Network L.L.C., Englewood, CO (US)

(72) Inventor: Joshua Hartmann, Cheyenne, WY (US)

(73) Assignee: DISH NETWORK L.L.C., Englewood, CO (US)

( * ) Notice: Subject to any disclaimer, the term of this patent is extended or adjusted under 35 U.S.C. 154(b) by 0 days.

(21) Appl. No.: 16/840,002

(22) Filed: Apr. 3, 2020

(51) Int. Cl.
| | | |
|---|---|---|
| G06F 15/16 | (2006.01) | |
| H04L 29/06 | (2006.01) | |
| H04N 21/84 | (2011.01) | |
| H04L 29/08 | (2006.01) | |
| H04N 21/45 | (2011.01) | |
| G06F 3/048 | (2013.01) | |

(52) U.S. Cl.
CPC ............ *H04L 65/60* (2013.01); *G06F 3/048* (2013.01); *H04L 67/10* (2013.01); *H04L 69/22* (2013.01); *H04N 21/4532* (2013.01); *H04N 21/84* (2013.01)

(58) Field of Classification Search
USPC ................................................ 709/203, 231
See application file for complete search history.

(56) References Cited

U.S. PATENT DOCUMENTS

| 7,921,207 | B2* | 4/2011 | DeCenzo | H04N 21/47202 |
| | | | | 709/224 |
| 8,145,701 | B2* | 3/2012 | Kley | G06F 16/184 |
| | | | | 709/203 |
| 8,555,371 | B1* | 10/2013 | Signaoff | H04L 63/02 |
| | | | | 726/12 |
| 8,732,195 | B2* | 5/2014 | Skeen | G06F 16/686 |
| | | | | 707/769 |
| 8,745,388 | B2* | 6/2014 | Kanungo | H04L 65/602 |
| | | | | 713/168 |
| 8,892,691 | B2* | 11/2014 | Pantos | H04L 65/607 |
| | | | | 709/219 |
| 2002/0138848 | A1* | 9/2002 | Alao | H04L 29/06027 |
| | | | | 725/109 |
| 2005/0177624 | A1* | 8/2005 | Oswald | H04L 67/322 |
| | | | | 709/219 |
| 2005/0177853 | A1* | 8/2005 | Williams | H04N 21/2181 |
| | | | | 725/81 |
| 2008/0244660 | A1* | 10/2008 | Wodka | H04N 21/47214 |
| | | | | 725/58 |

(Continued)

*Primary Examiner* — Anthony Mejia

(74) *Attorney, Agent, or Firm* — Seed IP Law Group LLP

(57) ABSTRACT

A facility for generating analytical information based on individual reports of multiple scheduled presentations of interstitial media assets is provided. Data files are received, each including multiple status reports regarding multiple scheduled presentations of multiple media assets by a plurality of distinct media receiver devices in multiple disparate locations. The data files are decrypted, such that the decrypted one or more data files include, for each of the multiple status reports, at least a media asset identifier and a presentation status indicator, and parsed to generate one or more database entries containing information regarding the scheduled media presentations and the plurality of distinct media receiver devices. One or more user interfaces are provided to allow execution of queries based on the generated one or more databases.

20 Claims, 12 Drawing Sheets

(56) References Cited

U.S. PATENT DOCUMENTS

| | | | | |
|---|---|---|---|---|
| 2010/0017824 A1* | 1/2010 | Malik | ............ | H04N 21/44204 |
| | | | | 725/46 |
| 2010/0071053 A1* | 3/2010 | Ansari | ............ | G08B 13/19656 |
| | | | | 726/12 |
| 2014/0282723 A1* | 9/2014 | Sinha | ................ | H04N 21/812 |
| | | | | 725/35 |

* cited by examiner

Today's Breaks — 301g

Overall
Scheduled  Aired  Missed
BRK_SCHO  BRK_AIRO  BRK_MISO
351a  351b  351c

Western Arc
Scheduled  Aired  Missed
BRK_SCHW  BRK_AIRW  BRK_MISW
353a  353b  353c

Eastern Arc
Scheduled  Aired  Missed
BRK_SCHE  BRK_AIRE  BRK_MISE
355a  355b  355c Last updated  RFSH_TIMESTAMP
357

*Fig. 3G*

[Provider] Import — 301h

TAGS
Current  New
PTAG_COUNT  PTAG_NEW
359a  359b

STBs
Current  New
STB_COUNT  STB_NEW
361a  361b

Success  363

Errors  RunTime
0  02:43.30
365a  365b

Last run on  PROVTAG_TIMESTAMP
367

*Fig. 3H*

Run Rate Success by Asset for REG3 on DATE8

| | Raw Rate | MPBS Rate | Adjusted MPBS Rate | | | | | | | | | |
|---|---|---|---|---|---|---|---|---|---|---|---|---|
| | 97.66% | 98.66% | 99.66% | | | | | | | | | |

| Asset | Raw Rate | MPBS Rate | Adjusted MPBS Rate | Successes | Failures | Successes | Failures | Channels | Runs | Invalid | Runs | No Data | Missed Breaks | MPEG2 Processed | Missed Unique Breaks Assets | MPEG4 Processed | Last Spooled |
|---|---|---|---|---|---|---|---|---|---|---|---|---|---|---|---|---|
| | | | | | | 363,745 | 6,308 | | 619 | 0 | 4 | 4 | | | 4 58 | | |
| ASST77835 | | | | 373 | 1 | | | 1 | 1 | 0 | 0 | 0 | 2019-07-18 | | 2019-07-18 | 2020-01-31 |
| ASST77957 | | | | 1,461 | 3 | | | 1 | 3 | 0 | 1 | 1 | 2019-02-18 | | 2019-02-18 | 2020-01-31 |
| ASST13618 | | | | 389 | 2 | | | 3 | 1 | 0 | 0 | 0 | 2019-06-07 | | 2019-03-07 | 2020-01-31 |
| ASST46162 | | | | 855 | 2 | | | 2 | 3 | 0 | 0 | 0 | 2019-07-19 | | 2019-07-19 | 2020-01-31 |
| ASST46163 | | | | 486 | 0 | | | 1 | 1 | 0 | 0 | 0 | 2019-07-19 | | 2019-07-19 | 2020-01-31 |
| ASST77837 | | | | 2,060 | 15 | | | 4 | 4 | 0 | 0 | 0 | 2019-09-30 | | 2019-09-30 | 2020-02-01 |
| ASST86956 | | | | 0 | 15 | | | 1 | 1 | 0 | 0 | 0 | 2019-10-04 | | 2019-10-04 | 2020-02-01 |
| ASST62337 | | | | 301 | 0 | | | 1 | 1 | 0 | 0 | 0 | 2019-11-25 | | 2019-11-25 | 2020-01-31 |
| ASST62401 | | | | 119 | 0 | | | 1 | 1 | 0 | 0 | 0 | 2019-12-30 | | 2019-12-30 | 2020-02-01 |
| ASST62402 | | | | 1,179 | 3 | | | 1 | 1 | 0 | 0 | 0 | 2019-12-30 | | 2019-12-30 | 2020-01-30 |
| ASST42848 | | | | 370 | 0 | | | 1 | 1 | 0 | 0 | 0 | 2019-12-27 | | 2019-12-27 | 2020-02-01 |

*Fig. 4B*

Run Success Rates for ASST77837 in REG3 on DATE8

| Break Status | Valid | Run Code | Break ID | OrderLine ID | Service | Rate | Successes | Failures | Window End Time | Aired Time |
|---|---|---|---|---|---|---|---|---|---|---|
| ● | ● | 1 | BRK5126 | 6598975 | ABCH | 99.15% | 1,161 | 10 | 2020-02-02 09:00:00 | 2020-02-02 09:10:43 |
| ● | ● | 1 | BRK5726 | 6598975 | DEFH | 100% | 339 | 0 | 2020-02-02 11:00:00 | 2020-02-02 10:08:00 |
| ● | ● | 1 | BRK8648 | 6598975 | GHIH | 100% | 176 | 0 | 2020-02-02 11:00:00 | 2020-02-02 10:16:01 |
| ● | ● | 1 | BRK8951 | 6598975 | JKLH | 98.78% | 404 | 5 | 2020-02-02 12:00:00 | 2020-02-02 10:33:06 |

445 Break Status
447 Valid
449 Run Code
451 Break ID
453 OrderLine ID
455 Service
457 Rate
459 Successes
461 Failures
463 Window End Time
465 Aired Time
400c

*Fig. 4C*

MEDIA DELIVERY NOTIFICATION DATA INGESTION AND DISPLAY

BACKGROUND

Technical Field

The present disclosure relates to media distribution, and in particular to analysis and presentation of information related to multichannel media delivery notification data.

Description of the Related Art

Multichannel media distribution platforms, such as satellite television service providers and cable television service providers, interact with large numbers of hardware devices associated with their respective consumer subscribers. As one example, a multichannel media distribution platform may provide desired multimedia programming to hundreds of thousands, or even millions, of set-top boxes ("STBs" or "STB devices"), respectively located at client locations, in order to facilitate those STBs receiving, storing, scheduling, and displaying that multimedia programming. A main television receiver, such as a set-top box ("STB") provided by a cable or satellite television service provider, is connected to a cable or satellite television service provider and serves as the interface between the backend cable or satellite television service provider system and the home entertainment system on the customer premises. Such multimedia programming may include entertainment or other programs requested or otherwise selected by a consumer subscriber, as well as a variety of interstitial media programming such as advertisements or other promotional media.

In various scenarios, interstitial media programming or other media programming provided via these large numbers of STBs may be scheduled for presentation in conjunction with one or more media programming broker services and/or provided in conjunction with one or more media asset data service providers. The provision of interstitial media programming may include coordinated delivery of digital files that include multiple days' worth of scheduled media presentations delivered ahead of time ("spooled") to each of hundreds of thousands, or even millions, of STB devices. Even assuming such coordinated delivery occurs without error, various entities—including the multichannel media distribution platform associated with those STB devices, one or more media programming broker services, advertisers who may pay for individual instances ("impressions") of the scheduled media presentations, and one or more media asset data service providers—have an interest in determining the individual and/or aggregated status of the scheduled media presentations.

BRIEF SUMMARY

A method in a multichannel media distribution computing system may be summarized as including receiving, by one or more processors of the multichannel media distribution computing system and from a remote data server, one or more data files, each of the one or more data files including multiple status reports regarding multiple scheduled presentations of multiple media assets by a plurality of distinct media receiver devices in multiple disparate locations; decrypting, by the one or more processors, the one or more data files in accordance with a first decryption protocol such that the decrypted one or more data files comprise, for each of the multiple status reports, at least a media asset identifier and a presentation status indicator; parsing, by the one or more processors, the decrypted one or more data files to generate one or more database entries containing information regarding the scheduled media presentations and the plurality of distinct media receiver devices; and providing a user interface to allow one or more users to execute queries based on the generated one or more databases.

One or more non-transitory computer-readable media may be summarized as collectively having contents configured to cause one or more processors of a multichannel media distribution system to perform a method, the method including: receiving, by the one or more processors and from a remote data server, one or more data files, each of the one or more data files including multiple status reports regarding multiple scheduled presentations of multiple media assets by a plurality of distinct media receiver devices in multiple disparate locations; decrypting, by the one or more processors, the one or more data files in accordance with a first decryption protocol such that the decrypted one or more data files comprise, for each of the multiple status reports, at least a media asset identifier and a presentation status indicator; parsing, by the one or more processors, the decrypted one or more data files to generate one or more database entries containing information regarding the scheduled media presentations and the plurality of distinct media receiver devices; and providing a user interface to allow one or more users to execute queries based on the generated one or more databases.

A multichannel media distribution system may be summarized as comprising: a communication interface to receive one or more data files from a remote data server, each of the one or more data files including multiple status reports regarding multiple scheduled presentations of multiple media assets by a plurality of distinct media receiver devices in multiple disparate locations; a decryption engine to decrypt the one or more data files in accordance with a first decryption protocol such that the decrypted one or more data files include, for each of the multiple status reports, at least a media asset identifier and a presentation status indicator; a parsing engine to parse the decrypted one or more data files in order to generate one or more database entries containing information regarding the scheduled media presentations and the plurality of distinct media receiver devices; and a user interface manager to provide one or more user interfaces, each of the provided one or more user interfaces to allow one or more users to request information based at least in part on the generated one or more database entries.

BRIEF DESCRIPTION OF THE SEVERAL VIEWS OF THE DRAWINGS

FIGS. 3 and 3A through 3H illustrate examples of a dashboard presentation of various information generated for display by an exemplary Multichannel Media Distribution computing system in accordance with techniques described herein.

FIGS. 4A through 4C illustrate examples of interactive reporting functionality provided by an exemplary Multichannel Media Distribution computing system in accordance with techniques described herein.

DETAILED DESCRIPTION

Figure 1:
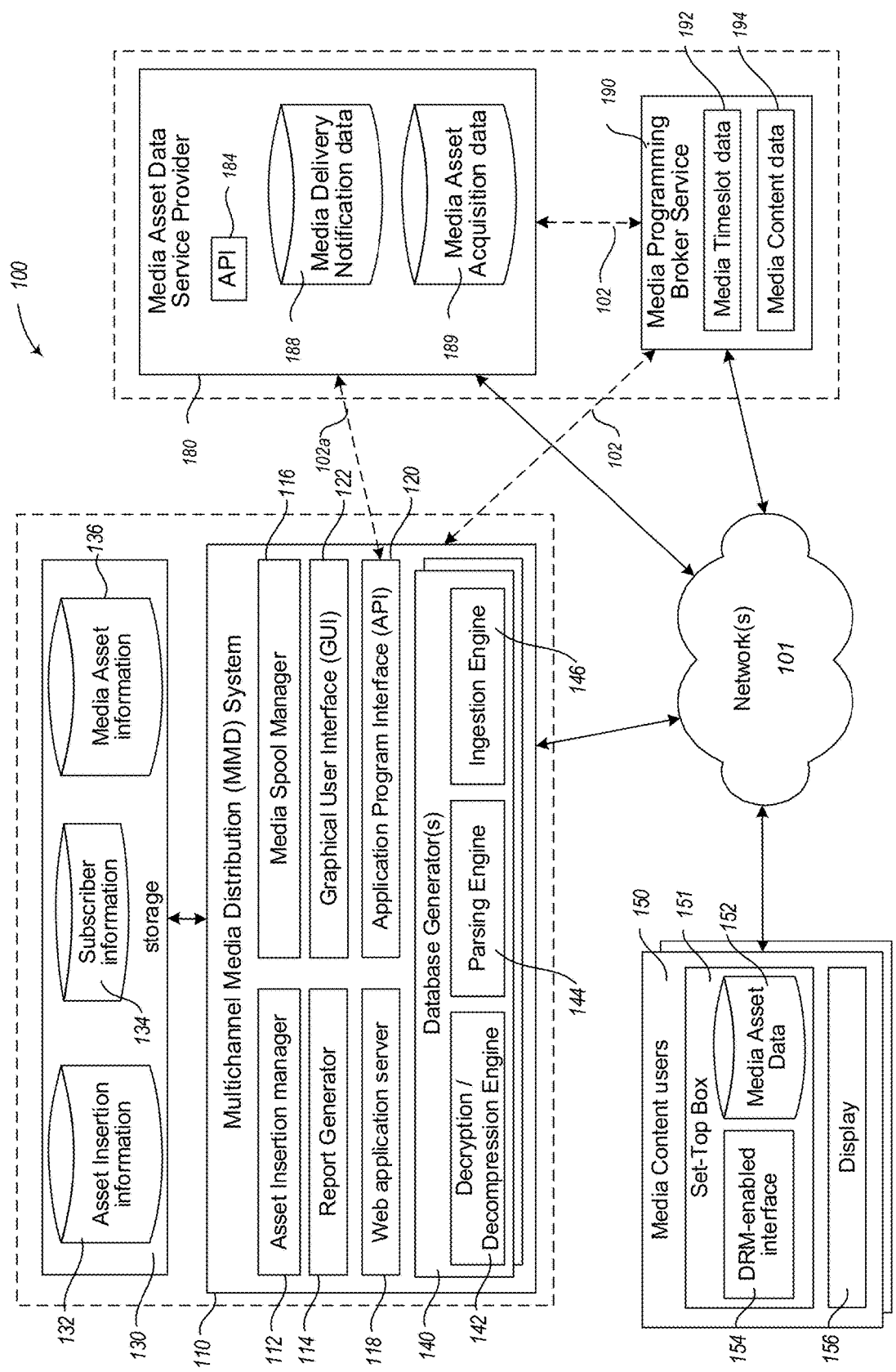
FIG. 1 is an overview block diagram illustrating an exemplary networked environment in which an embodiment of a Multichannel Media Distribution System provides interstitial media programming to a plurality of media presentation devices in accordance with techniques described herein.

The inventor has identified disadvantages with conventional approaches to determining various information related to individual or aggregated status reports regarding the actual delivery of scheduled interstitial media presentations via a multichannel media distribution platform. In particular, the inventor has recognized that conventional approaches to distribution and review of status information regarding the delivery and display of such scheduled media presentations (also termed herein as "Media Delivery Notifications" or "MDNs") fail to allow timely and accurate assessment of the delivery of those scheduled media presentations, as well as additional information regarding the status of hardware devices and distribution channels associated with them.

In response to the inventor's recognition of these disadvantages, the inventor has conceived and reduced to practice a software and/or hardware facility ("the facility") for timely and accurately decompressing, decrypting, parsing, ingesting, and/or displaying status information regarding actual delivery of scheduled media presentations via a multichannel media distribution platform. In certain scenarios, one or more operations performed via the facility in accordance with techniques described herein may be performed by one or more embodiments of a Multichannel Media Distribution (MMD) System.

In certain embodiments, a media programming broker service provides media timeslot data and/or other scheduling information regarding the scheduled future display of multiple media assets to an MMD platform (e.g., a satellite television service provider or cable television service provider) associated with a large plurality of media content users (interchangeably termed "subscribers" herein), with each of those media content users having one or more STB devices located at a customer premises location. Based on the provided scheduling information, the MMD platform provides ("spools") one or more media asset files containing the multiple media assets to some or all of those STB devices in advance of the scheduled future display, such as via satellite transmission, wired transmission, one or more network connections, etc. For example, in an exemplary scenario and embodiment, the MMD platform may at various times spool up to four days' interstitial media assets (including but not necessarily limited to advertisement media assets) to a subset of STB devices (such as STB devices associated with some or all customers located in a particular geographical region) in advance of the scheduled display of those interstitial advertisements. In this manner, a particular STB device may store all such interstitial media assets scheduled for presentation within the next four days. In various embodiments, spooling of the interstitial media assets may occur at regular intervals (such as daily or semi-daily), in response to one or more events (such as responsive to receiving scheduling information regarding one or more new interstitial media assets, to receiving an indication that the STB device is in a low-activity state, or other event) or other time.

Following the scheduled time for the presentation of one or more interstitial media assets, each of the plurality of STB devices may provide a status report regarding each of one or more scheduled presentations of each interstitial media asset. In various embodiments and scenarios, such status reports may be provided at regular intervals (such as daily or semi-daily), in response to one or more events (such as responsive to an indication that the STB device is in a low-activity state, or other event) or other time. For example, an STB device may provide a report associated with multiple past scheduled presentations of an interstitial media asset, with each of the multiple scheduled presentations indicating one of a finite number of status codes. In at least one embodiment, such status codes may include (as non-limiting examples): Success (indicating that the interstitial media asset was displayed as scheduled); Error (indicating that the interstitial media asset was either unavailable for display or otherwise prevented from being displayed as scheduled); Warning (indicating one or more issues arising from the scheduled display of the interstitial media asset that did not prevent its scheduled display); Debug (indicating a response to one or more test codes provided to the STB device); or Invalid (indicating that the scheduling information identifying the interstitial media asset was determined to be incorrect). It will be appreciated that any number or arrangement of status codes or other indicative schema regarding the results of scheduled media presentations may be utilized in accordance with the techniques described herein.

Status reports provided from one or more STB devices may in various scenarios be sent directly to the MMD platform, and/or to one or more media asset data service providers. In an exemplary embodiment, such status reports are provided to a media asset data service provider that aggregates, compresses, encrypts, and transmits one or more resulting media delivery notification (MDN) data files to the MMD platform. However, such MDN data files fail to provide substantive analysis, qualitative information, or various performance metrics for the MMD platform, the media asset data service providers, or the STB devices responsible for displaying the scheduled interstitial media assets.

In one or more embodiments, a media asset data service provider transmits (such as via one or more computer networks or other transmission medium) one or more MDN data files to an MMD computing system ("MMD system") associated with the MMD platform for analysis. In such embodiments, the MMD system (or other embodiment of the facility) receives the MDN data files and performs various operations to generate, visualize, and display additional information regarding the individual and aggregated status reports provided by the plurality of STB devices regarding the actual presentation of the scheduled interstitial media assets. As non-limiting examples, in various embodiments such operations may include one or more of the following: decompressing the one or more MDN data files (if, for example, the data files have been compressed in order to conserve network or other transmission bandwidth); decrypting the one or more MDN data files in accordance with one or more decryption protocols, such that the decrypted MDN data files may include (for each of the multiple status reports) at least a media presentation identifier and a presentation status indicator; generating one or more databases containing information related to the included status reports, as well as to the scheduled interstitial media assets and corresponding scheduling information; and parsing the decrypted MDN data files, such as to generate one or more database entries corresponding to each included status report, the associated STB device, and/or the scheduled interstitial media asset. In various embodiments, for example, generating such database entries may include generating information regarding multiple distinct success rates for the scheduled interstitial media asset presentations (e.g., a "raw" success rate, an "average" or other statistically calculated success rate, etc.); generating one or more visualizations of a success rate for at least some of the scheduled interstitial media asset presentations, including one or more visualizations of such success rates over an indicated time period; applying one or more "tags" to a subset of STB devices based at least in part on the included status reports, such as may be utilized by the MMD system, advertisers, or other entities to distinguish various targetable sets of STB devices based on characteristics of media content users associated with those STB devices; generating information based on one or more geographical locations or regions that include a subset of the corresponding STB devices; generating information regarding transmission times associated with providing the scheduled interstitial media assets to some or all of the corresponding STB devices; and other information.

In various embodiments, the facility may provide various functionality to enable presentation of one or more aspects of data and/or databases generated by the facility based on the provided status reports. As non-limiting examples, in various embodiments such functionality may include one or more of the following: providing a user interface—such as a command-line query interface, a graphical user interface ("GUI"), or Application Program Interface ("API")—to allow one or more users to execute queries based on the generated databases; to generate and display one or more reports regarding various subsets of data included in the generated databases; to generate and display, such as in real-time or with respect to recent subsets of data included in the generated databases, a graphical "dashboard" that includes the display of selected aspects of such data; to generate and display one or more visualizations of subsets of data included in the generated databases; etc.

By performing these or other operations in accordance with techniques described herein, the facility enables users of the facility to timely and accurately determine individual and/or aggregated status reports regarding the delivery and/or display of scheduled media presentations, such as interstitial media programming.

Also, the facility improves the functioning of computer or other hardware, such as by reducing the dynamic display area, processing, storage, and/or data transmission resources needed to perform various tasks, thereby enabling the tasks to be performed by less capable, capacious, and/or expensive hardware devices, and/or be performed with less latency, and/or preserving more of the conserved resources for use in performing other tasks or additional instances of the same task. The facility also prevents the expenditure of human and computing resources that would otherwise be utilized to overcome the limitations of raw data provided by a plurality of STB devices with respect to timely and accurate assessment of such data.

FIG. 1 is an overview block diagram illustrating an exemplary networked environment 100 that includes a Multichannel Media Distribution (computing) System 110, a media asset data service provider 180, a media programming broker service 190, and a plurality of media content users 150 that are each associated with at least one STB device 151. For purposes of clarity, the exemplary networked environment 100 includes a single media asset data service provider 180 and a single media programming broker service 190; it will be appreciated that in various scenarios and embodiments, multiple such entities may be communicatively connected with, and provide one or more services to, the exemplary MMD system 110.

In operation, the MMD system 110 provides interstitial media programming to the plurality of media content users 150 via one or more media asset data files in accordance with presentation schedules provided by the media programming broker service 190. In the depicted networked environment 100, the MMD system provides the media content users 150 with a multitude of video and/or data programming (herein, collectively "programming") via the associated STB device 151. The programming may include any type of media content, including, but not limited to: television shows, news, movies, sporting events, advertisements, etc. In various embodiments, any of this programming may be provided as a type of programming referred to as streaming media content, which is generally digital multimedia data that is substantially constantly received by and presented to an end-user or presented on a device while being delivered by a provider from a stored file source. Its verb form, "to stream," refers to the process of delivering media in this manner. The term refers to how the media is delivered rather than the media itself.

During operation, the media programming broker service 190 maintains media timeslot data 192 and media content data 194, and based on that maintained data provides scheduling information for future interstitial media asset presentations to the MMD system, such as to provide indications of indicated timeslots for interstitial advertisements that have been purchased by advertisers or their representatives for display during "breaks" in other scheduled programming. Based at least in part on the provided scheduling information, the MMD system spools sets (or "packages") of multiple corresponding interstitial media assets to multiple STB devices 151. In this manner, the MMD system may store all interstitial media assets scheduled for display during a preselected time period (e.g., for multiple upcoming days at a time) as at least part of the media asset data stored by STB devices 151 via media asset data storage 152. During that preselected time period, and in accordance with scheduling information provided to each STB device 151 by the MMD system 110 via asset insertion manager 112, each STB device 151 initiates the insertion of an indicated interstitial media asset into each of one or more such breaks occurring during programming being presented to one or more associated media content users 150 via a corresponding display device 156.

In at least the depicted embodiment, each STB device 151 additionally generates a status report message regarding each attempt to initiate insertion of an indicated interstitial media asset, including a status code reflecting one or more types of success or failure in displaying the interstitial media asset. The generated status report messages are provided to media asset data service provider 180, which aggregates and packages the status report messages from one or more pluralities of STB devices 151 as described in greater detail elsewhere herein. In certain scenarios and embodiments, for example, the packaged MDN data files may be stored via one or more distinct formats, one or more distinct encryption schema, and/or one or more distinct compression algorithms. The resulting MDN data files may be stored or otherwise maintained by the media asset data service provider via MDN database 188 and/or media asset acquisition database 189. The media asset data service provider 180 then provides the packaged MDN data files to the MMD system, such as via network(s) 101 and/or a dedicated data connection 102*a*.

After receiving the MDN data files from the media asset data service provider 180, the MMD system 110 performs one or more operations (described in greater detail elsewhere herein) to decompress and/or decrypt (via decryption/decompression engine 142), parse (via parsing engine 144), and ingest (via ingestion engine 146) the MDN data files in order to generate one or more database entries corresponding to each status report message included therein, as well as to generate, visualize, and display additional information related to those generated database entries, such as via one or more of report generator 114, GUI 122, Web application server 118, and/or API 120.

In the depicted exemplary networked environment 100, the media asset data service provider, media programming broker service 190, and STB devices 151 are each communicatively coupled to the MMD system 110 via one or more intervening networks 101, which may comprise one or more computer networks, one or more wired or wireless networks, satellite transmission media, one or more cellular networks, or some combination thereof. The network(s) 101 may include a publicly accessible network of linked networks, possibly operated by various distinct parties, such as the Internet. The network 101 may include other network types, such as one or more private networks (e.g., corporate or university networks that are wholly or partially inaccessible to non-privileged users), and may include combinations thereof, such that (for example) one or more of the private networks have access to and/or from one or more of the public networks. Furthermore, the network 101 may include various types of wired and/or wireless networks in various situations, including satellite transmission. In addition, users within the exemplary networked environment 100 may utilize additional client computing systems and/or other client devices (not shown) to interact with the MMD system 110 to obtain various described functionality via the network(s) 101, and in doing so may provide various types of information to the MMD system 110. In certain implementations, the various users and providers of the networked environment 100 may interact with the MMD system and/or one or more other users and providers using an optional private or dedicated connection, such as one of dedicated connections 102.

In the depicted embodiment, the MMD system 110 includes an asset insertion manager 112, a report generator 114, a media spool manager 116, and a web application server 118. In addition, the MMD system includes an Application Program Interface ("API") 120, a Graphical User Interface ("GUI") 122, and one or more database generators 140, each of which includes a decryption/decompression engine 142, a parsing engine 144, and an ingestion engine 146. The MMD system is communicatively coupled (locally or remotely) to storage facility 130, which includes asset insertion information database 132, subscriber information database 134, and media asset information database 136. In certain implementations, the storage facility 130 may be incorporated within or otherwise directly operated by the MMD system; in other implementations, some or all of the functionality provided by the storage facility may be provided by one or more third-party network-accessible storage service providers. The storage facility 130 may also comprise multiple separate storage facilities and streaming media content servers geographically separated from each other, each of which may provide stored media content to particular media content user locations based on a number of factors, such as geographical proximity, load balancing parameters, current demand on the storage facility 130 and/or the networks 101, capacity of the storage facility and/or the network(s), etc.

The interactions of the MMD system 110 with the media asset data service provider 180, media programming broker service 190, and media content users 150 may occur in various ways, such as in an interactive manner via a graphical user interface 122 that is provided by the MMD system to users and associated client devices (not shown) via at least some Web pages of a MMD system Web site, such as may be facilitated and supported by one or both of GUI 122 and web application server 118. Information may also be provided in a programmatic manner by one or more client software applications via the Application Program Interface ("API") 120 provided by the MMD system that allows computing systems and/or programs to invoke such functionality programmatically, such as using Web services or other network communication protocols. Similarly, interactions with the media asset data service provider may be provided in a programmatic manner by one or more client software applications via API 184.

Each STB device 151 interconnects to one or more communications media or sources. For example, the various media content may be delivered as data via a packet-switched network such as the Internet or other packet-switched network, via satellite transmission, or other manner. The underlying connection carrying such data may be via a cable head-end, satellite antenna, telephone company switch, cellular telephone system, Ethernet portal, off-air antenna, or the like. The STB device 151 may receive a plurality of programming by way of the communications media or sources, or may only receive programming via a particular channel or source. In some embodiments, based upon selection by a user, the STB device 151 processes and communicates the selected programming to the display device 156. Also, in some embodiments, the display device 156 may also be a STB device 151 or have a STB device 151 integrated within it.

In various embodiments, examples of an STB device 151 include, but are not limited to, one or a combination of the following: a "television converter," "receiver," "set-top box," "television receiving device," "television receiver," "television," "television recording device," "satellite set-top box," "satellite receiver," "cable set-top box," "cable receiver," "media player," "digital video recorder (DVR)," "digital versatile disk (DVD) Player," "computer," "mobile device," "tablet computer," "smart phone," "MP3 Player," "handheld computer," and/or "television tuner," etc. Accordingly, the STB device 151 may be any suitable converter device or electronic equipment that is operable to receive programming via a connection to a satellite or cable television service provider outside the media content user premises and communicate that programming to another device over a network. Further, the STB device 151 may itself include user interface devices, such as buttons or switches.

In at least the depicted embodiment, the STB device 151 is configured via DRM-enabled interface 154 to receive and decrypt content received from the MMD system according to various digital rights management and other access control technologies and architectures. Furthermore, in at least some embodiments, the STB device 151 may include an API that provides programmatic access to one or more functions of the STB device 151. For example, such an API may provide a programmatic interface to one or more functions that may be invoked by any other program, a remote control (not shown), one or more content providers and/or program distributors, one or more information providers, a local and/or remote content storage system, or some other module. In this manner, the API may facilitate the development of third-party software, such as various different on-demand service applications, user interfaces, plug-ins, adapters (e.g., for integrating functions of the STB device 151 into desktop applications), and other functionality. In at least the depicted embodiment, the DRM-enabled interface 154 may facilitate the receiving, decrypting, decoding, processing, selecting, recording, playback and displaying of programming, as well as the establishing of an Internet Layer end-to-end security connection, such as a secure IP tunnel. The DRM-enabled interface 154 may also facilitate on-demand media services (e.g., video-on-demand or "VOD" services), on-demand program ordering, processing, and DRM and key management and storage corresponding to processing received streaming media content and other programming. In some embodiments, recorded or buffered programming received by the STB devices 151 as spooled or streaming media content, or other types of programming, may reside within media asset data storage 152, either in decrypted or encrypted form as applicable for securely storing, processing and displaying of the received media content according to any applicable DRM associated with the particular programming. The media asset data storage 152 may also store various program metadata associated with the recorded or buffered programming stored by the STB device 151, such as that including, but not limited to, DRM data, tags, codes, identifiers, format indicators, timestamps, user identifications, authorization codes, digital signatures, etc. In addition, the media asset data storage 152 may include user profiles, preferences and configuration data, etc.

In at least the depicted embodiment, the STB device 151 is configured to process media content (including media programming as well as interstitial media assets) and render the media content for display on the display device 156. As part of such processing, the STB device 151, in some embodiments working in conjunction with a media content decryption and encryption engine and/or a data transmission module, may encode, decode, encrypt, decrypt, compress, decompress, format, translate, perform digital signal processing, adjust data rate and/or complexity or perform other processing on the data representing received programming and other media content as applicable for presenting the received content in real time on the display device as it is being received by the STB device 151. In various embodiments, examples of a display device 156 may include, but are not limited to, one or a combination of the following: a television ("TV"), a monitor, a personal computer ("PC"), a sound system receiver, a digital video recorder ("DVR"), a compact disk ("CD") device, DVD Player, game system, tablet device, smart phone, mobile device or other computing device or media player, and the like. Each of the display devices 156 typically employs a display, one or more speakers, and/or other output devices to communicate video and/or audio content to a user. In many implementations, one or more display devices 156 reside in or near a media content user's premises and are communicatively coupled, directly or indirectly, to the STB device 151. Further, the STB device 151 and the display device 156 may be integrated into a single device. Such a single device may have the above-described functionality of the STB device 151 and the display device 156, or may even have additional functionality.

In certain embodiments, the MMD system may receive at least some programming content, such as television content, via one or more third-party content providers or associated media distributors (not depicted for purposes of clarity). Exemplary content providers and associated media distributors include television stations, which provide local or national television programming; and special content providers, which provide premium-based programming, pay-per-view programming, and on-demand programming.

Encryption and decryption described herein may be performed as applicable according to one or more of any number of currently available or subsequently developed encryption methods, processes, standards, protocols, and/or algorithms, including but not limited to: encryption processes utilizing a public-key infrastructure (PKI), encryption processes utilizing digital certificates, the Data Encryption Standard (DES), the Advanced Encryption Standard (AES 128, AES 192, AES 256, etc.), the Common Scrambling Algorithm (CSA), encryption algorithms supporting Transport Layer Security 1.0, 1.1, and/or 1.2, encryption algorithms supporting the Extended Validation (EV) Certificate, etc.

The above description of the exemplary networked environment 100 and the various service providers, systems, networks, and devices therein is intended as a broad, non-limiting overview of an exemplary environment in which various embodiments of the facility may be implemented. FIG. 1 illustrates just one example of a multichannel media distribution system 110, its users, and service providers communicatively coupled thereto, and the various embodiments discussed herein are not limited to such environments. In particular, exemplary networked environment 100 may contain other devices, systems and/or media not specifically described herein.

Figure 2:
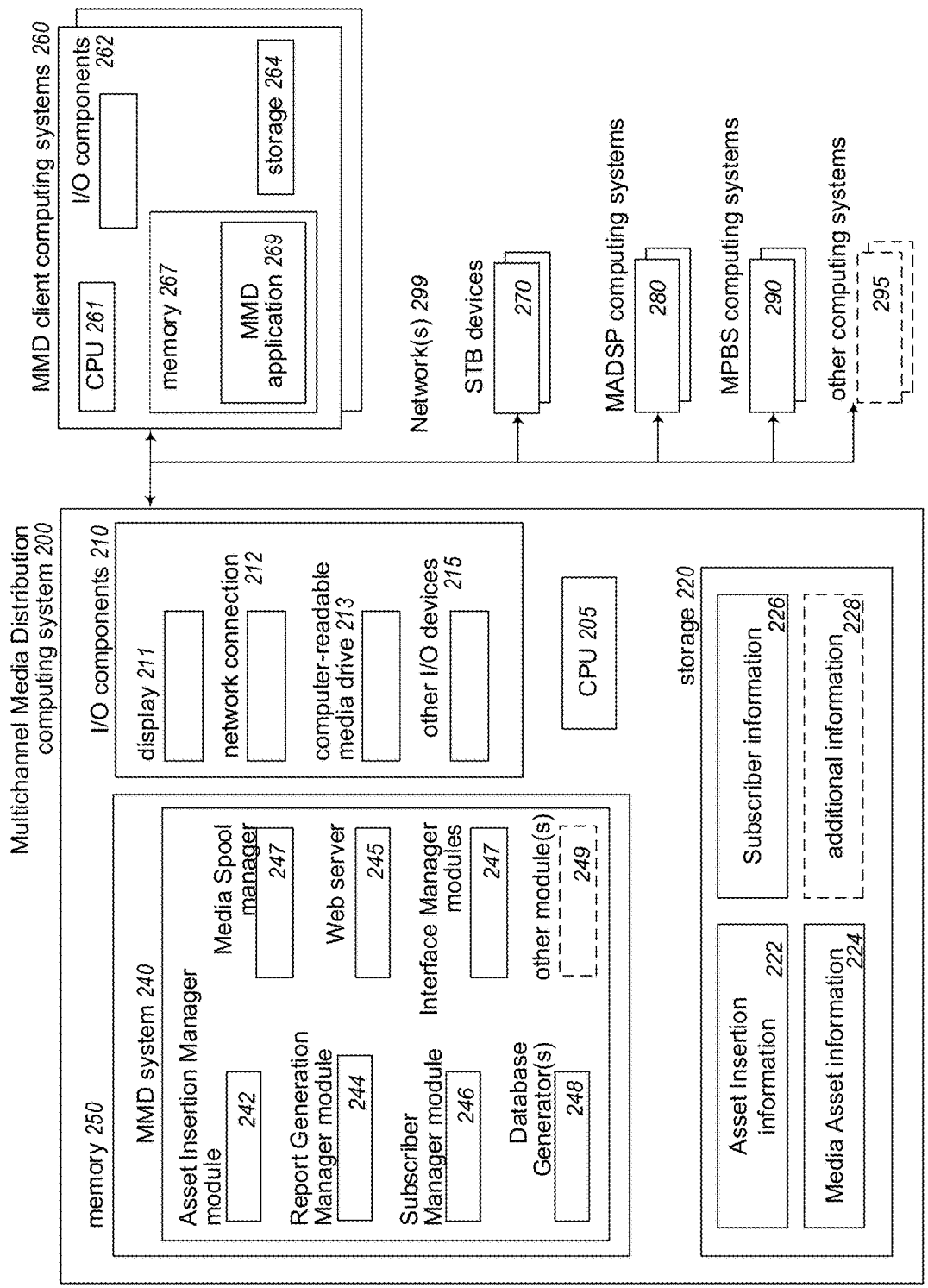
FIG. 2 is a block diagram illustrating elements of an exemplary Multichannel Media Distribution computing system utilized in accordance with techniques described herein.

FIG. 2 is a block diagram illustrating an embodiment of an MMD server computing system 200 that is suitable for performing at least some of the described techniques, such as by executing an embodiment of an MMD system. The MMD computing system 200 includes one or more central processing units ("CPU") or other processors 205, various input/output ("I/O") components 210, storage 220, and memory 250, with the illustrated I/O components 210 including a display 211, a network connection 212, a computer-readable media drive 213, and other I/O devices 215 (e.g., keyboards, mice or other pointing devices, microphones, speakers, GPS receivers, etc.). The server computing system 200 and MMD system 240 may communicate with other computing systems via one or more networks 299 (which generally function as described with respect to network(s) 101 of FIG. 1), such as MMD client computing systems 260, STB devices 270, media asset data service provider (MADSP) computing systems 280, media programming broker service (MPBS) computing systems 290, and other computing systems 295. Some or all of the other computing systems may similarly include some or all of the types of components illustrated for MMD computing system 200 (e.g., to have an MMD system client application 269 executing in memory 267 of a client computing system 260 in a manner analogous to MMD system 240 in memory 250, with the client computing system 260 further including I/O components 262 and computer-readable storage 264).

In the illustrated embodiment, an embodiment of the MMD system 240 executes in memory 250 in order to perform at least some of the described techniques, such as by using the processor(s) 205 to execute software instructions of the system 240 in a manner that configures the processor(s) 205 and computing system 200 to perform automated operations that implement those described techniques. As part of such execution, the MMD system 240 operates in conjunction with multiple submodules to support the described techniques. In particular, in the depicted embodiment the MMD system 240 includes asset insertion manager module 242; report generation manager module 244; Web server 245; subscriber manager module 246; a media spool manager 247; one or more interface manager modules 247; one or more database generators 248; and may further include one or more other modules 249. As part of such automated operations, the system 240, its depicted components modules, and/or other optional programs or modules 249 executing in memory 230 may store and/or retrieve various types of data, including in the exemplary database data structures of storage 220. In this example, the data used may include various types of asset insertion information in database ("DB") 222, various types of media asset information in DB 224, various types of subscriber information in DB 226, and/or various types of other information in DB(s) 228, such as various information related to one or more media asset data service providers and/or media programming broker services.

It will be appreciated that computing system 200 and devices/systems 260, 270, 280, 290, and 295 are merely illustrative and are not intended to limit the scope of the present invention. The systems and/or devices may instead each include multiple interacting computing systems or devices, and may be connected to other devices that are not specifically illustrated, including through one or more networks such as the Internet, via the Web, via satellite transmission, or via private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable and other fitness tracking devices, biometric monitoring devices, digital music player devices, handheld gaming devices, PDAs, wireless phones, pagers, electronic organizers, Internet appliances, television systems, and various other consumer products that include appropriate communication capabilities. In addition, the functionality provided by the illustrated MMD system 240 may in some embodiments be distributed in various modules. Similarly, in some embodiments, some of the functionality of the MMD system 240 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., the MMD system 240 and/or MMD client software executing on devices 260, 270, 280, 290, and/or 295) and/or data structures, such as by execution of software instructions of the one or more software programs and/or by storage of such software instructions and/or data structures. Furthermore, in some embodiments, some or all of the systems and/or modules may be implemented or provided in other manners, such as by consisting of one or more means that are implemented at least partially in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

In various embodiments, one or more components/modules of the facility, as well as various components/modules of the computing systems described herein, may be implemented using standard programming techniques. For example, such components/modules may be implemented as a "native" executable running on one or more processors (such as CPU(s) 205 and/or CPU(s) 261 of FIG. 2), along with one or more static or dynamic libraries. In other embodiments, such components/modules may be implemented as instructions processed by a virtual machine that executes as another program. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, PHP, jQuery, and the like), or declarative (e.g., SQL, Prolog, and the like).

The embodiments described herein may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs or other processors. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve desired functions.

In addition, programming interfaces described herein may be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. As non-limiting examples, storage facility 130 of FIG. 1 and/or storage 220 of FIG. 2 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve desired functions.

Various exemplary presentations for information generated by an MMD system will now be provided with respect to particular embodiments shown for illustrative purposes, although it will be appreciated that other embodiments may include more and/or less information, and that various types of illustrated information may be replaced with other information. It will be appreciated that throughout these figures, various numerical or identifying data may have been replaced by textual variable identifiers in the corresponding figures in order to maintain the confidentiality of certain specific data.

Figure 3:
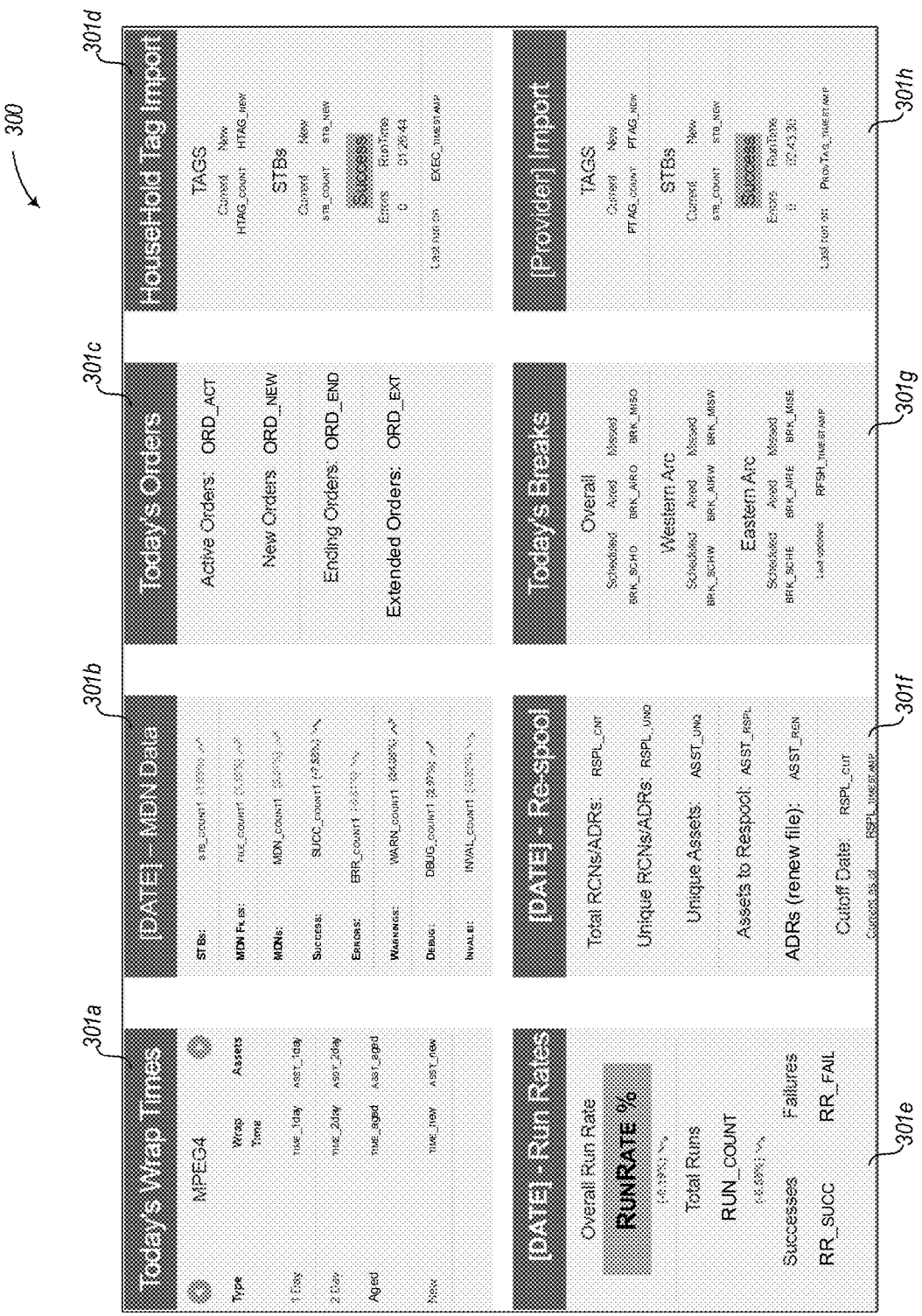

FIG. 3 depicts a "dashboard" presentation 300 of various data generated by an embodiment of the facility (such as by the MMD system 110 of FIG. 1 and/or the MMD computing system 200 of FIG. 2), such as responsive to the receipt, decompression, decryption, parsing, and ingestion of one or more MDN data files. In the depicted embodiment, the dashboard presentation 300 includes multiple distinct panels 301a-301h of related information, which may be displayed on one or more display devices communicatively coupled to one or more client computing systems (e.g., MMD client computing systems 260 of FIG. 2). By displaying the generated information in this manner, the facility may significantly improve the timely depiction of relevant and/or selected status reports provided from one or more indicated pluralities of STB devices associated with the MMD system, as well as from one or more media asset data service providers and media programming broker services.

In the depicted embodiment, the dashboard presentation 300 includes a first dashboard panel 301a, comprising information related to various time information regarding the respective durations of multiple selected processes (colloquially termed "wrap times"), executed on the current date of presentation, for spooling interstitial media assets to one or more sets of STB devices in advance of the scheduled display of those interstitial media assets. Additional details regarding the generated information displayed by the first dashboard panel 301a is provided below with respect to FIG. 3A.

The dashboard presentation 300 further includes a second dashboard panel 301b, comprising information related to all media delivery notification data received for the current date from a plurality of STB devices, such as may have been provided via one or more MDN data files from one or more media asset data service providers. Additional details regarding the generated information displayed by the second dashboard panel 301b is provided below with respect to FIG. 3B.

The dashboard presentation 300 further includes a third dashboard panel 301c, comprising information related to interstitial media asset order information for the current day, with each order reflecting advertiser-placed or other orders for the scheduled presentation during the current day of a specified interstitial media asset. Additional details regarding the generated information displayed by the third dashboard panel 301c is provided below with respect to FIG. 3C.

The dashboard presentation 300 further includes a fourth dashboard panel 301d, comprising information related to one or more "tags" related to media content users, such as may be imported by an exemplary embodiment of an MMD system based on information received from one or more sources, including a media asset data service provider or other source. Such tags may be useful, for example, to distinguish various targetable sets of STB devices based on characteristics of media content users associated with those STB devices. Additional details regarding the generated information displayed by the fourth dashboard panel 301d is provided below with respect to FIG. 3D.

The dashboard presentation 300 further includes a fifth dashboard panel 301e, comprising information related to success rates for scheduled presentations during the current date of one or more interstitial media assets. Additional details regarding the generated information displayed by the fifth dashboard panel 301e is provided below with respect to FIG. 3E.

The dashboard presentation 300 further includes a sixth dashboard panel 301f, comprising information related to interstitial media assets being re-spooled (that is, spooled for storage despite nominally being considered previously stored) to a plurality of STB devices on the current date. Additional details regarding the generated information displayed by the sixth dashboard panel 301f is provided below with respect to FIG. 3F.

The dashboard presentation 300 further includes a seventh dashboard panel 301g, comprising information related to breaks during selected media programming for the current date, including information based on multiple geographical areas, during which interstitial media assets have been scheduled for presentation. Additional details regarding the generated information displayed by the seventh dashboard panel 301g is provided below with respect to FIG. 3G.

The dashboard presentation 300 further includes an eighth dashboard panel 301h, comprising information related to one or more "tags" related to media content users, such as may be imported by the MMD system based on information received from a specified source. In a manner similar to that described above with respect to the fourth dashboard panel 301d, tags may be useful to (as a non-limiting example) distinguish various targetable sets of STB devices based on characteristics of media content users associated with those STB devices. Additional details regarding the generated information displayed by the eighth dashboard panel 301h is provided below with respect to FIG. 3H.

Figures 3A, 3B:

FIG. 3A depicts a detailed view of first dashboard panel 301a from FIG. 3, which includes information related to various time information regarding the respective durations of multiple selected processes (colloquially termed "wrap times"), executed on the current date of presentation, for spooling interstitial media assets to one or more sets of STB devices in advance of the scheduled display of those interstitial media assets. In particular, the first dashboard panel 301a includes a media format selection field 303, indicating that the current display relates to those interstitial media assets formatted as MPEG4 files. In certain embodiments, the media format selection may allow a user to selectively view information related to a particular type of interstitial media content, such as to distinguish between standard-definition ("SD"), high-definition ("HD"), or other content type. The first dashboard panel 301a further includes a breakdown of four distinct collections of scheduled interstitial media assets that have been spooled to a quantity of STB devices, each with an indicated Type 305a, indicating a respective timeframe during which the corresponding interstitial media assets have been spooled; an indicated Wrap Time 305b, indicating the duration of the spooling processes required to transmit the corresponding interstitial media assets to the selected set of STB devices; and an indicated quantity of Assets 305c, indicating the number of interstitial media assets that were spooled during those corresponding spooling processes. The current display of the first dashboard panel 301a indicates the following: collection type 307a delineates those interstitial media assets spooled during the current date, with a wrap time designated as variable identifier TIME_1 day and a quantity of interstitial media assets designated as variable identifier ASST_1 day; collection type 307b delineates those interstitial media assets spooled during the previous two days, with a collective wrap time designated as variable identifier TIME_2 day and a quantity of interstitial media assets designated as variable identifier ASST_2 day; collection type 307c delineates those interstitial media assets still indicated as stored by the corresponding STB devices but that were spooled prior to that two-day time period, with a wrap time designated as variable identifier TIME_aged and a quantity of interstitial media assets designated as variable identifier ASST_aged; and collection type 307d delineates those interstitial media assets that have been spooled during the current date and that were not spooled during the previous date, with a wrap time designated as variable identifier TIME_new and a quantity of interstitial media assets designated as variable identifier ASST_new.

FIG. 3B depicts a detailed view of second dashboard panel 301b from FIG. 3, which includes information related to all media delivery notification data received for the current date from a plurality of STB devices, such as may have been provided via one or more MDN data files from one or more media asset data service providers. In particular, the second dashboard panel 301b includes an STB device count 309, indicating a quantity of STB devices (designated as variable identifier STB_COUNT1) that have reported the status of one or more scheduled presentations of interstitial media assets for the current date or, in certain embodiments and scenarios, within the past 24 hours; an MDN file count, designated as variable identifier FILE_COUNT1 and indicating a quantity of MDN data files via which the indicated status reports were received by the MMD system; an MDN count, designated as variable identifier MDN_COUNT1 and indicating a quantity of individual status reports received for the current date; and status counts 315a-315e, each of which denotes a total count of MDN reports having the indicated status identifier ("Success," "Errors," "Warnings," "Debug," and "Invalid," respectively), with the actual count designated as a respective variable (SUCC_COUNT1, ERR_COUNT1, WARN_COUNT1, DBUG_COUNT1, and INVAL_COUNT1, respectively). In addition, each of the indicated data fields 309, 311, 313, and 315a-315e are depicted with a corresponding comparative indicator 317, which provides the viewer with an indication of how the current depicted quantity respectively compares with that quantity from the prior date. For example, the MMD system has identified that the STB device count 309, corresponding to the current date and designated as variable identifier STB_COUNT1, is 1.05% higher than yesterday's corresponding STB device count. In contrast, the MMD system has identified that the quantity of MDN reports having the "Success" status identifier is 7.55% lower than the corresponding number from yesterday.

Figures 3C, 3D:
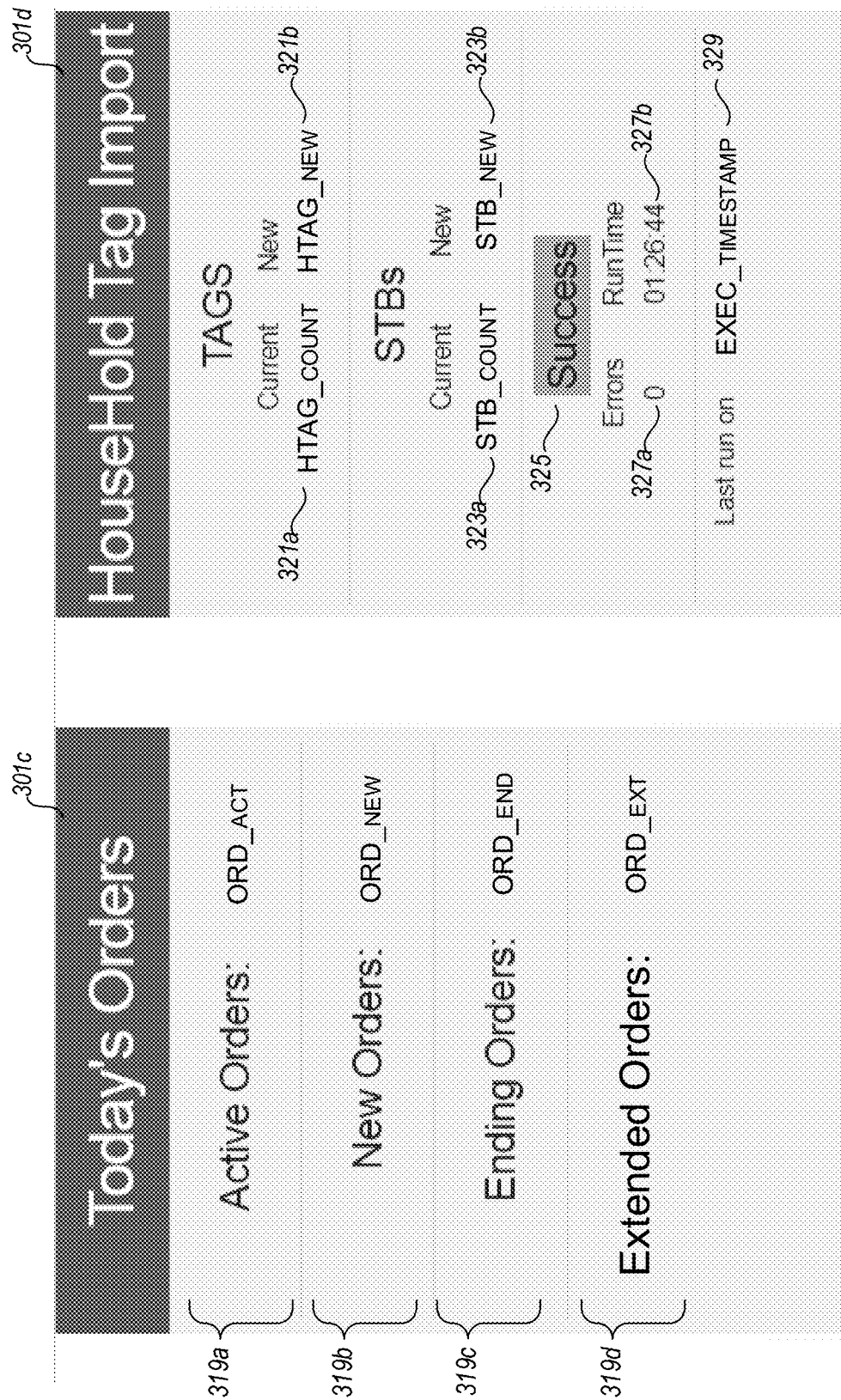

FIG. 3C depicts a detailed view of third dashboard panel 301c from FIG. 3, which includes information related to interstitial media asset order information for the current day, such as may reflect advertiser-placed or other orders for the scheduled presentation during the current day of individual interstitial media assets. In particular, the third dashboard panel 301c includes an active order count 319a, designated as variable identifier ORD_ACT and indicating a quantity of active orders for the current date; a new order count 319b, designated as variable identifier ORD_NEW and indicating a quantity of those orders that are new for the current date (in contrast, for example, with recurring orders placed for the current date but also for one or more previous dates); ending order count 319c, designated as variable identifier ORD_END and indicating a quantity of orders for the current date that are not currently scheduled for future dates; and extended order count 319d, designated as variable identifier ORD_EXT and indicating a quantity of orders for the current date that have been extended to one or more future dates.

FIG. 3D depicts a detailed view of fourth dashboard panel 301d from FIG. 3, which includes information related to one or more "tags" related to media content users, such as may be imported by the MMD system based on information received from one or more sources. As non-limiting examples, such tags may be used to characterize STB devices associated with media content users having various characteristics, such as: program viewing habits, program recording habits, online activities, a quantity of household members, age or other demographic information associated with one or more household members, and other characteristics. In the depicted embodiment, the fourth dashboard panel 301d includes a current household tag count 321a, designated as variable identifier HTAG_COUNT and indicating a count of those tags imported during the current date; a new household tag count 321b, designated as variable identifier HTAG_NEW and indicating a count of those tags imported during the current date that were not imported for the previous date; a current STB device count 323a, designated as variable identifier STB_COUNT and indicating a quantity of STB devices to which the current household tags have been applied; a new STB device count 323b, designated as variable identifier STB_NEW and indicating a quantity of STB devices to which newly imported household tags have been applied; a process status indicator 325, currently indicating that the importation process for the indicated household tags was successfully completed; an error count 327a, currently indicating that zero errors have been reported with respect to the importation process for the indicated household tags; a run time indicator 327b, indicating that the importation process for the indicated household tags was completed in 1 hour, 26 minutes and 44 seconds; and an execution timestamp 329, designated as variable identifier EXEC_TIMESTAMP and indicating the time at which the importation process was initiated.

Figures 3E, 3F:
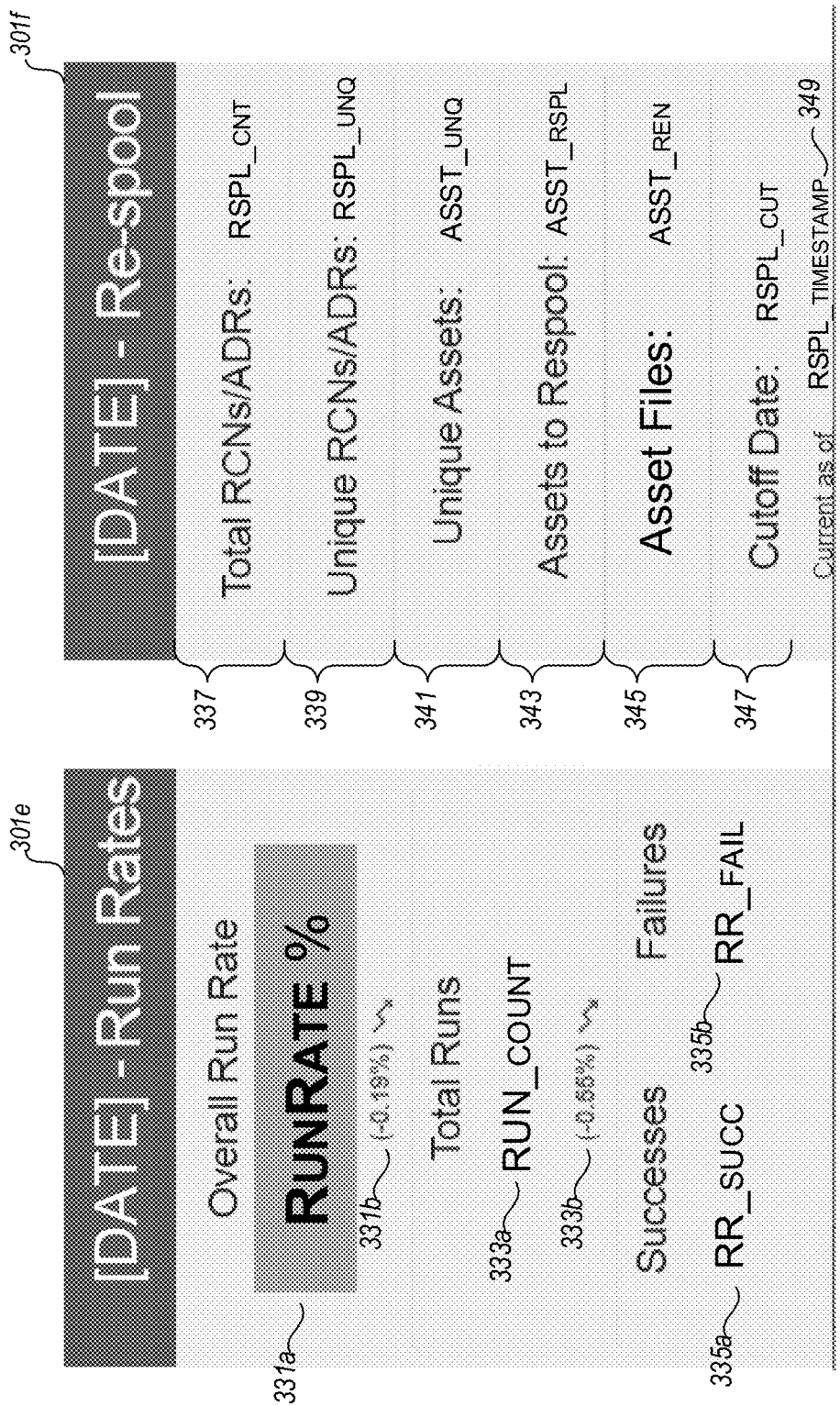

FIG. 3E depicts a detailed view of fifth dashboard panel 301e from FIG. 3, which includes information related to success rates for scheduled presentations during the current date of one or more interstitial media assets. In particular, the fifth dashboard panel 301e includes an overall run rate indicator 331a, designated as variable identifier RUNRATE and indicating a percentage success rate for scheduled interstitial media asset presentations for the current date; a run rate comparison indicator 331b, indicating a comparative percentage of the current success rate with that identified from the previous date; a run count indicator 333a, designated as variable identifier RUN_COUNT and indicating a quantity of distinct interstitial media assets reportedly presented on the current date; a run count comparison indicator 333b, indicating a comparative percentage of the current run count with that identified from the previous date; run rate success count 335a, designated as variable identifier RR_SUCC and indicating a total number of distinct presentations of interstitial media assets performed on the current date; and run rate failure count 335b, designated as variable identifier RR_FAIL and indicating a total number of distinct failed instances of initiating the presentation of scheduled interstitial media assets on the current date.

FIG. 3F depicts a detailed view of sixth dashboard panel 301f from FIG. 3, which includes information related to all interstitial media assets being re-spooled (that is, spooled for storage despite nominally being considered previously stored) on the current date to a plurality of STB devices. In particular, the sixth dashboard panel 301f includes a total re-spool count 337, designated as variable identifier RSPL_CNT and indicating a total quantity of interstitial media assets being re-spooled on the current date; a unique re-spool count 339, designated as variable identifier RSPL_UNQ and indicating a quantity of unique scheduled presentations of interstitial media assets being re-spooled on the current date; unique asset count 341, designated as variable identifier ASST_UNQ and indicating a quantity of unique interstitial media assets being re-spooled on the current date; re-spool asset threshold 343, designated as variable identifier ASST_R-SPB and indicating a threshold quantity of interstitial media assets to re-spool on the current date (such as may be configured by one or more administrators of the MMD system); asset file count 345, designated as variable identifier ASST_REN and indicating the quantity of asset package files via which the interstitial media assets being re-spooled on the current date are stored and transmitted; cutoff date 347, designated as variable identifier RSPL_CUT and indicating the earliest date (typically between 1 and 10 days prior to the current date) for which the interstitial media assets are being re-spooled; and re-spool timestamp 349, designated as variable identifier RSPL_TIMESTAMP and indicating the most recent time at which the indicated re-spooling has completed.

FIG. 3G depicts a detailed view of seventh dashboard panel 301g from FIG. 3, which includes information related to breaks during selected media programming for the current date, including information based on multiple geographical areas, during which interstitial media assets have been scheduled for presentation. In particular, the seventh dashboard panel 301g displays generated data indicators indicating a quantity of breaks associated with media programming for the current date as presented by a plurality of STB devices communicatively coupled to the MMD system. In the depicted embodiment, the breaks have been delineated based on only two separate geographic areas (a "Western arc" and "Eastern arc," respectively); it will be appreciated that in various other embodiments, any preferred schema of designated geographical areas may be used. In particular, in the current embodiment, the seventh dashboard panel 301g includes an overall quantity 351a of scheduled breaks, designated as variable identifier BRK_SCHO; a quantity 351b of such breaks that aired as scheduled, designated as variable identifier BRK_AIRO; and a quantity 351c of such breaks that were missed (such as breaks in one or more segments of scheduled media programming that did not occur for one or more reasons, such as programming preemption, programming cancellation, etc.), designated as variable identifier BRK_MISO. In addition, the seventh dashboard panel includes information regarding such scheduled breaks delineated according to the Western and Eastern designated geographic areas: an overall quantity 353a of scheduled breaks for the Western region, designated as variable identifier BRK_SCHW; a quantity 353b of such breaks that aired as scheduled for the Western region, designated as variable identifier BRK_AIRW; and a quantity 353c of such breaks that were missed in the Western region, designated as variable identifier BRK_MISW; an overall quantity 355a of scheduled breaks for the Western region, designated as variable identifier BRK_SCHE; a quantity 355b of such breaks that aired as scheduled for the Western region, designated as variable identifier BRK_AIRE; a quantity 355c of such breaks that were missed in the Western region, designated as variable identifier BRK_MISE: and a recency indicator 357, designated as variable identifier RFSH_TIMESTAMP and indicating the most recent time at which the other fields of the dashboard panel 301g have been updated.

FIG. 3H depicts a detailed view of eighth dashboard panel 301h from FIG. 3, which includes information related to one or more "tags" related to media content users, such as may be imported by the MMD system based on information received from a specified source entity designated here simply as [Provider]. As non-limiting examples, specified source entities from which such tags may be imported include one or more financial entities, credit reporting agency entities, advertiser entities, affiliates or partners of an entity operating the MMD system, etc. It will be appreciated that in various scenarios and embodiments, tags imported via the process from which information was generated with respect to the fourth dashboard panel 301d, as well as tags imported from a specified source entity and presented in this eighth dashboard panel 301h, may both be commonly applied to one or more STB devices.

In the depicted embodiment, the eighth dashboard panel 301h includes a current provider tag count 359a, designated as variable identifier PTAG_COUNT and indicating a count of those tags imported from the designated source entity during the current date; a new provider tag count 359b, designated as variable identifier PTAG_NEW and indicating a count of those tags imported from the designated source entity during the current date that were not similarly imported for the previous date; a current STB device count 361a, designated as variable identifier STB_COUNT and indicating a quantity of STB devices to which the current tags imported from the designated source entity have been applied; a new STB device count 361b, designated as variable identifier STB_NEW and indicating a quantity of STB devices to which provider tags newly imported from the designated source entity have been applied; a process status indicator 363, currently indicating that the importation process for the indicated provider tags was successfully completed; an error count 365a, currently indicating that zero errors have been reported with respect to the process for importing the indicated tags from the designated source entity; a run time indicator 365b, indicating that the importation process for the indicated tags was completed in 2 hours, 43 minutes and 30 seconds; and an execution timestamp 367, designated as variable identifier PROVTAG_TIMESTAMP and indicating the time at which the importation process was initiated.

Figure 4A:
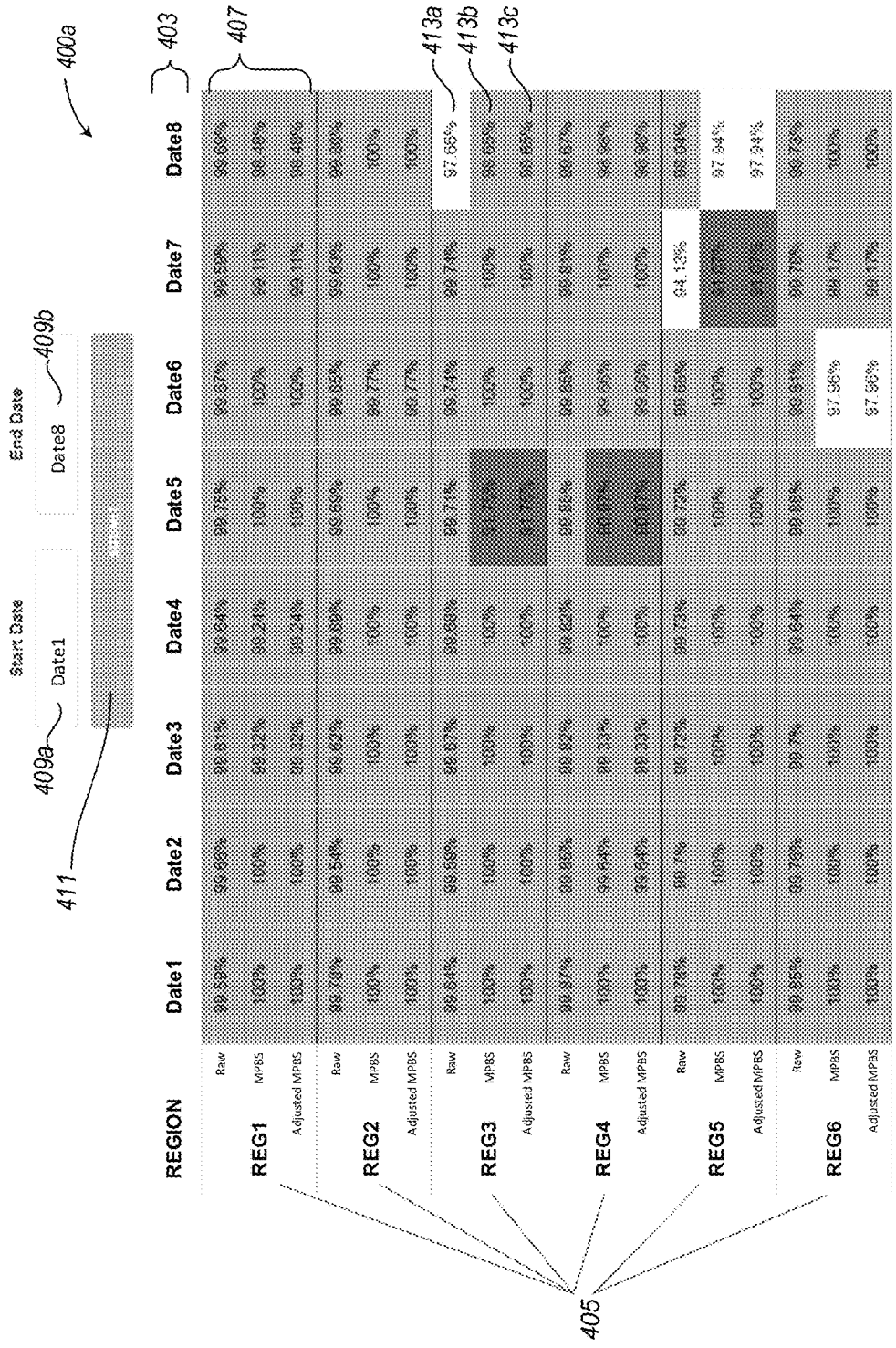

FIGS. 4A through 4C illustrate examples of interactive reporting functionality provided by an exemplary Multichannel Media Distribution system. Such reporting functionality may be provided, for example, by MMD system 110 of FIG. 1 via one or more of report generator 114, GUI 122, and web application server 118; and/or by MMD computing system 200 of FIG. 2 via one or more of report generation manager module 244, Web server 245, and interface manager modules 247.

FIG. 4A depicts an exemplary interactive reporting facility 400a, which displays selected information generated by the MMD system in accordance with the various techniques described herein. In particular, in the depicted embodiment the interactive reporting facility 400a provides multiple run rate data across a time span of eight days (Date1 through Date8, identified via date identifiers 403) for a plurality of STB devices located in six distinct geographic regions 405 respectively denoted by identifiers REG1, REG2, . . . , REG8). As a non-limiting example, in certain embodiments each of the distinct geographic regions 405 may represent a one or more distinct television media markets. For each respective date and geographic region, three distinct run rate success data types 407 are provided: a "Raw" success rate, an "MPBS" success rate (such as may be calculated in accordance with requirements or reporting parameters specified by or for a particular media programming broker service), and an "Adjusted MPBS" success rate (such as may be calculated in accordance with MPBS-specific reporting parameters as adjusted by the MMD system per additional specified parameters). As one example, the raw success rate for all scheduled presentations of interstitial media assets on Date8 for region REG3 is provided by data segment 413a as being 97.66%; the corresponding MPBS success rate is provided by data segment 413b as being 98.65%; and the corresponding Adjusted MPBS success rate is provided by data segment 413c as also being 98.65%. In the depicted embodiment, a user viewing the interactive reporting facility 400a may specify the particular date range for the reporting facility via starting date selection control 409a, ending date selection control 409b, and date selection submission control 411. It will be appreciated that in certain embodiments, other interactivity may be provided by the interactive reporting facility generated by the MMD system; alternatively, in certain embodiments the MMD system may generate similar visualizations for such data in one or more non-interactive formats.

FIG. 4B depicts an exemplary interactive reporting facility 400b, detailing run rate success data per interstitial media asset for region REG3 on date DATE8. In certain embodiments, the interactive reporting facility 400b may be displayed in response to one or more user actions, such as if a user viewing the interactive reporting facility 400a of FIG. 4A selected any of data segments 413a, 413b, or 413c in order to view additional details regarding the selected data segment. It will be appreciated that the term "selects," "selected," or "selecting," when used herein in relation to one or more elements of a graphical user interface or other electronic display, may include a variety of user actions taken with respect to various input control devices available depending on the client computing device used to interact with the display, such as one or more clicks using a mouse or other pointing device, one or more tapping interactions using a touch screen of a client device, etc.

In the depicted embodiment, the interactive reporting facility 400b includes a listing of interstitial media assets respectively identified by a unique interstitial media asset identifier 415, with various generated information being presented in association with each of those listed interstitial media assets and with respect to the indicated region REG3 and indicated date DATE8. In particular, each identified interstitial media asset is respectively associated with a raw success rate percentage 417; an MPBS success rate 419; an adjusted MPBS success rate 421; a successful presentation count 423; a failed presentation count 425; a channel count 427, indicating a quantity of distinct media channels on which each interstitial media asset was scheduled for display; a run count 429; an invalid status report count 431; a "no data" status report count 433; a missed break count 435; an MPEG2 processed date 437, indicating the date on which the associated interstitial media asset was processed in accordance with the indicated MPEG2 media format; an MPEG4 processed date field 439, indicating the date on which the associated interstitial media asset was processed in accordance with the indicated MPEG4 media format; and a "Last Spooled" date field 441, indicating the most recent date on which the associated interstitial media asset was spooled to one or more STB devices in the given region. It will be appreciated that in various scenarios and embodiments, a wide variety of information may be presented in the exemplified manner other than those specifically depicted in the embodiment of FIG. 4B without deviating from the techniques described herein.

FIG. 4C depicts an exemplary interactive reporting facility 400c, detailing run rate success data for a specific interstitial media asset associated with identifier ASST77837 in region REG3 on date DATE8. In certain embodiments, the interactive reporting facility 400c may be displayed in response to one or more user actions, such as if a user viewing the interactive reporting facility 400b of FIG. 4b selected interstitial media asset identifier 415f in order to view additional details regarding scheduled presentations of the selected interstitial media asset.

In the depicted embodiment, the interactive reporting facility 400c includes a listing of four distinct programming breaks in which one or more STB devices attempted to initiate presentation of the interstitial media asset ASST77837. For each such programming break, the interactive reporting facility provides a break status 445, indicating whether the corresponding programming break occurred as scheduled; break validity status 447, indicating whether the identified programming break accepted initiation of an interstitial media asset; run code 449, indicating whether any STB devices attempted to initiate presentation of the scheduled interstitial media asset during the identified programming break; break identifier 451, indicating a unique identifier for the corresponding programming break; order line identifier 453, indicating a unique identifier for the order (such as an advertising order) that specified the interstitial media asset was to be presented during the corresponding programming break; service identifier 455, typically indicating a television channel and/or type (e.g., "ABCH" to indicate a high-definition television channel carrying content provided by the ABC television network) on which the interstitial media asset was to be presented; success rate 457; success count 459; failure count 461; window end time 463, indicating the time by which the indicated order specified that the interstitial media asset was to be presented; and airtime indicator 465, indicating the time at which the interstitial media asset was actually presented.

Figure 5:
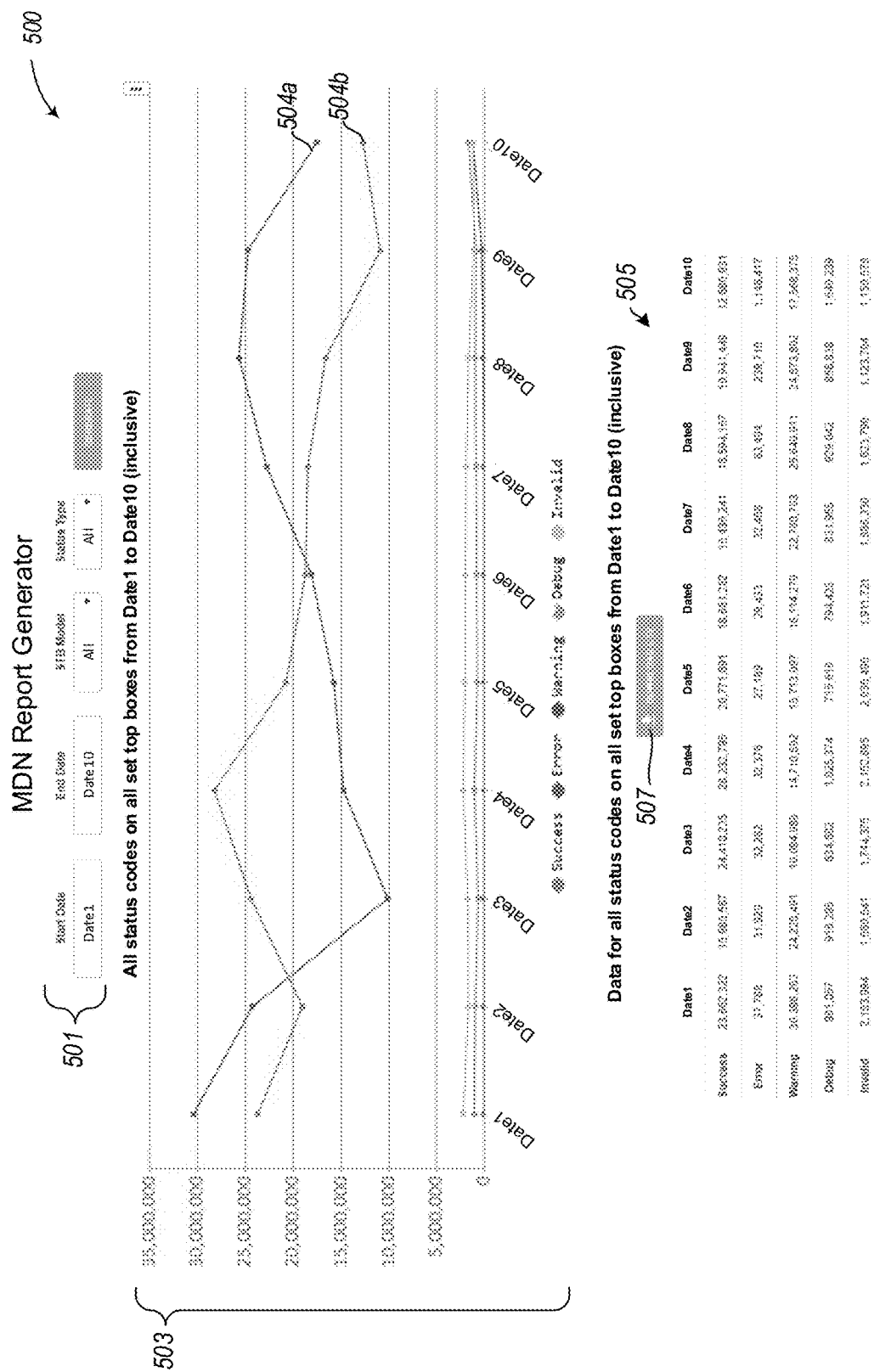
FIG. 5 illustrates another exemplary interactive reporting facility provided by an exemplary Multichannel Media Distribution computing system in accordance with techniques described herein.

FIG. 5 depicts an additional exemplary interactive reporting facility 500 as generated by an exemplary MMD system, detailing a visualization of all status codes received from a plurality of STB devices in an indicated date range from a first date Date1 to a second date Date10, inclusively. In various scenarios and embodiments, the interactive reporting facility may be displayed automatically based on one or more event criteria, or in response to one or more user actions or queries of a database of information generated by the MMD system based at least in part on one or more MDN data files received for the indicated date range. In the depicted embodiment, the interactive reporting facility 500 includes data selection controls 501, allowing a user to select starting and ending dates for the date range, as well as to selectively review data based on a model type of the reporting STB devices and on one or more types of status reports received from those devices. The interactive reporting facility further includes visualized reporting region 503, which provides a graphical display of millions of status reports for the selected date range based on the status types reported by millions of corresponding STB devices. As depicted in FIG. 5, the two most common status types for those status reports are "Warning," depicted via line graph 504a, and "Success," depicted via line graph 504b; each of several additional, less commonly reported status types ("Error," "Debug," and "Invalid," respectively) are similarly depicted via corresponding line graphs towards the bottom of the visualized reporting region 503. In addition, the interactive reporting facility 500 includes a data count tabular display 505, providing a table with delineated quantities of the various status types reported for each of the dates in the indicated date range, as well as a download selection control 507 to enable the user to download the provided data directly in a common "CSV" format. As with the other reporting facilities described with respect to FIGS. 3A-3H and 4A-4C, it will be appreciated that in certain embodiments, other interactivity may be provided, and that the MMD system may additionally generate similar visualizations for such data in one or more non-interactive formats.

Figure 6:
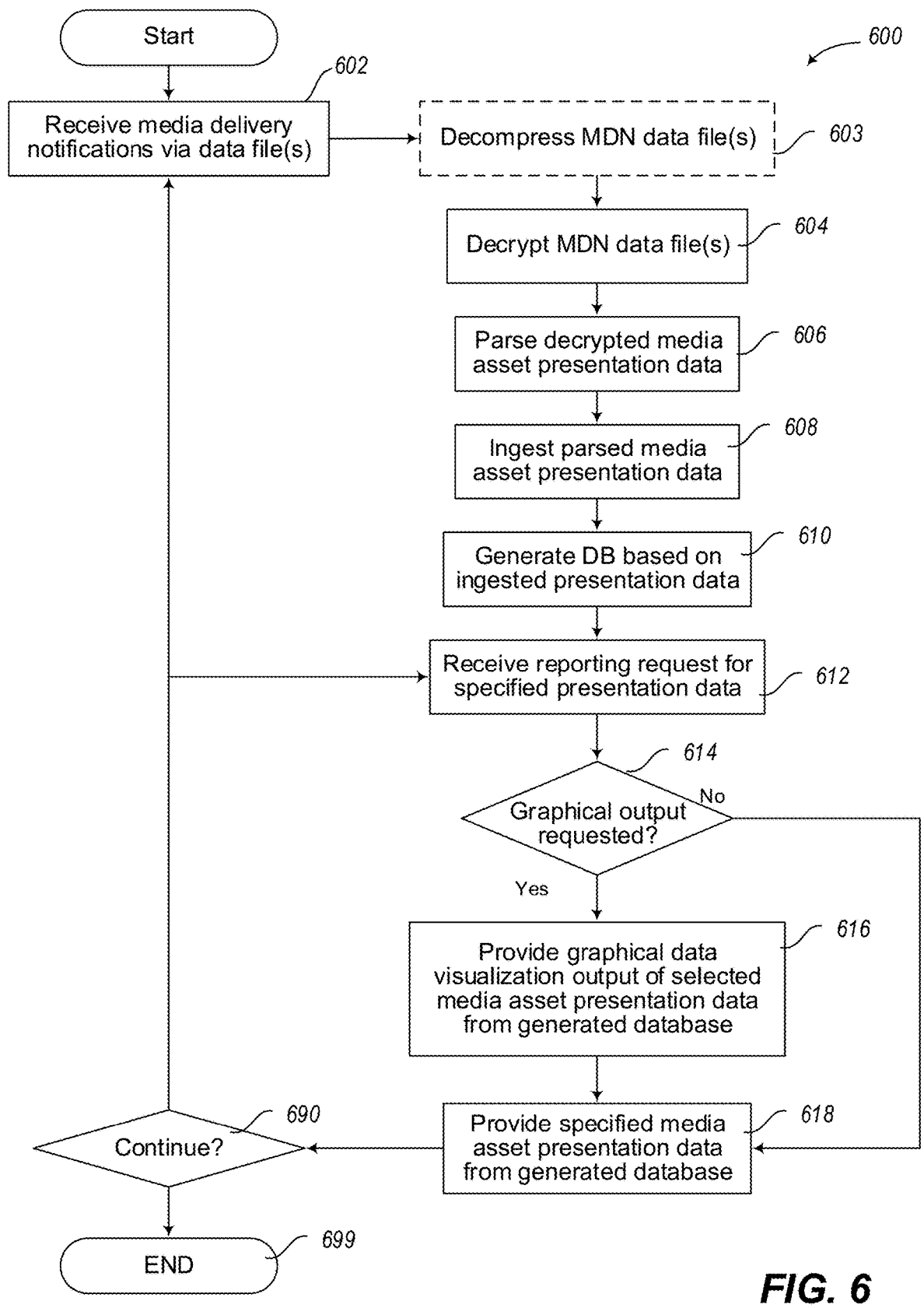
FIG. 6 is a flow diagram depicting an exemplary routine performed in accordance with the various techniques described herein in order to facilitate the timely and accurate analysis of status information regarding delivery of one or more scheduled media asset presentations.

FIG. 6 is a flow diagram showing an exemplary routine 600 performed by the facility, such as via a multichannel media distribution system, to facilitate the timely and accurate decompression, decryption, parsing, ingestion, and display of status information regarding actual delivery of scheduled media presentations by multiple STB devices.

The routine 600 begins at block 602, in which one or more data files containing multiple media delivery notifications are received, such as from one or more media asset data service providers. The routine proceeds to block 603 to begin processing the received data files.

At block 603, the routine optionally decompresses the one or more MDN data files, such as in response to detecting that the data files have been compressed in order to conserve transmission bandwidth and/or other resources. The routine proceeds to block 604.

At block 604, the routine decrypts the received (and potentially decompressed) one or more MDN data files in order to decipher the multiple interstitial media asset status reports contained therein. The routine proceeds to block 606.

At block 606, the routine parses the decrypted multiple interstitial media asset status reports. In certain embodiments, each such report includes an indication of multiple aspects of a scheduled presentation of an interstitial media asset. As non-limiting examples, such aspects may include: an STB device identifier; an STB device type/model; a current software and/or firmware version associated with the STB device; one or more geographic area identifiers associated with the STB device; a presentation status type, such as to identify whether the corresponding scheduled presentation was successful, resulted in a warning, or associated with one or more other presentation status types; a media asset identifier; an order identifier associated with the corresponding scheduled interstitial media asset presentation; a channel or service type associated with the corresponding scheduled presentation; a programming break identifier associated with the corresponding scheduled presentation; a presentation initiation time; a presentation completion time; a viewing mode or type associated with the corresponding scheduled presentation; or other aspects. The routine then proceeds to block 608.

At block 608, the routine initiates ingestion of the parsed media asset presentation data from the one or more received MDN data files, such as to generate additional information related to the multiple parsed status reports. Details and non-limiting examples regarding such additional information that may be generated in the course of ingesting the parsed media asset presentation data are described in greater detail elsewhere herein. The routine then proceeds to block 610.

At block 610, the routine initiates generation of one or more database entries regarding the parsed media asset presentation data, such as may include one or more aspects of the parsed presentation data itself, as well as additional information generated by the facility. In certain scenarios and embodiments, the generation of the one or more database entries may include generating one or more databases; alternatively, the facility may generate database entries for one or more existing databases, such as the facility may have previously caused to be stored and/or maintained. The routine proceeds to block 612.

At block 612, the routine receives one or more reporting requests for specified data related to the generated database entries. In various scenarios and embodiments, such reporting requests may be manually initiated by one or more users of the facility, such as via one or more database query parameters; may be automatically generated in response to one or more events, such as in response to the expiration of one or more regular intervals, or based on one or more scheduling parameters for the MMD system; and/or may be received from one or more remote computing systems communicatively coupled to the MMD system. The routine proceeds to block 614.

At block 614, the routine determines whether the received reporting request is for one or more graphical displays, such as to create or update one or more segments of a graphical dashboard display regarding the scheduled media asset presentation data and/or other information, or to generate one or more interactive reporting facilities based on such information. If so, the routine proceeds to block 616; otherwise, the routine proceeds to block 618.

At block 616, the routine provides graphical data visualization output of specified media asset presentation data based on a type and/or contents of the received reporting request. The routine proceeds to block 618.

At block 618, the routine provides specified media asset presentation data or generated information based on contents of one or more databases maintained by the facility, either in conjunction with the provided graphical data visualization output discussed with respect to block 616 or (such as if no graphical output was requested) separately. The routine proceeds to block 690.

At block 690, the routine determines whether to continue, such as in response to an express request to terminate. If the routine is to continue, it returns to block 602 to await additional MDN data files, or to block 612 in order to handle any additional reporting requests that have been received related to the existing media asset presentation databases. Otherwise, the routine proceeds to block 699 and ends.

Those skilled in the art will appreciate that the various operations depicted via FIG. 6, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a multichannel media distribution computing system, the method comprising:
    receiving, by one or more processors of the multichannel media distribution computing system and from a remote data server, one or more data files, each of the one or more data files including multiple status reports regarding multiple scheduled presentations of multiple media assets by a plurality of distinct media receiver devices in multiple disparate locations;
    decrypting, by the one or more processors, the one or more data files in accordance with a first decryption protocol such that the decrypted one or more data files comprise, for each of the multiple status reports, at least a media asset identifier and a presentation status indicator;
    parsing, by the one or more processors, the decrypted one or more data files to generate one or more database entries containing information regarding the scheduled media presentations and the plurality of distinct media receiver devices; and
    providing a user interface to allow one or more users to execute queries based on the generated one or more databases.

2. The method of claim 1, wherein decrypting the one or more data files in accordance with the first decryption protocol includes decompressing at least some of the one or more data files.

3. The method of claim 1, wherein providing the user interface includes providing a graphical user interface.

4. The method of claim 1, wherein providing the user interface includes providing an Application Programming Interface.

5. The method of claim 1, wherein receiving the one or more data files from the remote data server includes receiving the one or more data files from a first remote data server operated by a first entity, and wherein the method further comprises receiving scheduling information regarding the multiple scheduled presentations from a distinct second remote data server operated by a distinct second entity.

6. The method of claim 1, further comprising providing at least some of the multiple media assets to each of at least some media receiver devices of the plurality of distinct media receiver devices prior to the scheduled presentations of the at least some multiple media assets.

7. The method of claim 1, further comprising determining, based on the generated one or more database entries, an aggregated success rate associated with each of one or more subsets of the multiple scheduled presentations.

8. One or more non-transitory computer-readable media collectively having contents configured to cause one or more processors of a multichannel media distribution system to perform a method, the method comprising:
    receiving, by the one or more processors and from a remote data server, one or more data files, each of the one or more data files including multiple status reports regarding multiple scheduled presentations of multiple media assets by a plurality of distinct media receiver devices in multiple disparate locations;
    decrypting, by the one or more processors, the one or more data files in accordance with a first decryption protocol such that the decrypted one or more data files comprise, for each of the multiple status reports, at least a media asset identifier and a presentation status indicator;
    parsing, by the one or more processors, the decrypted one or more data files to generate one or more database entries containing information regarding the scheduled media presentations and the plurality of distinct media receiver devices; and
    providing a user interface to allow one or more users to execute queries based on the generated one or more databases.

9. The non-transitory computer-readable media of claim 8, wherein decrypting the one or more data files in accordance with the first decryption protocol includes decompressing at least some of the one or more data files.

10. The non-transitory computer-readable media of claim 8, wherein providing the user interface includes providing a graphical user interface.

11. The non-transitory computer-readable media of claim 8, wherein providing the user interface includes providing an Application Programming Interface.

12. The non-transitory computer-readable media of claim 8, wherein receiving the one or more data files from the remote data server includes receiving the one or more data files from a first remote data server operated by a first entity, and wherein the method further comprises receiving scheduling information regarding the multiple scheduled presentations from a distinct second remote data server operated by a distinct second entity.

13. The non-transitory computer-readable media of claim 8, wherein the method further comprises providing at least some of the multiple media assets to each of at least some media receiver devices of the plurality of distinct media receiver devices prior to the scheduled presentations of the at least some multiple media assets.

14. The non-transitory computer-readable media of claim 8, wherein the method further comprises determining, based on the generated one or more database entries, an aggregated success rate associated with each of one or more subsets of the multiple scheduled presentations.

15. A multichannel media distribution system, comprising:

a communication interface to receive one or more data files from a remote data server, each of the one or more data files including multiple status reports regarding multiple scheduled presentations of multiple media assets by a plurality of distinct media receiver devices in multiple disparate locations;

a decryption engine to decrypt the one or more data files in accordance with a first decryption protocol such that the decrypted one or more data files include, for each of the multiple status reports, at least a media asset identifier and a presentation status indicator;

a parsing engine to parse the decrypted one or more data files in order to generate one or more database entries containing information regarding the scheduled media presentations and the plurality of distinct media receiver devices; and a user interface manager to provide one or more user interfaces, each of the provided one or more user interfaces to allow one or more users to request information based at least in part on the generated one or more database entries.

16. The multichannel media distribution system of claim 15, wherein the decryption engine is further to decompress at least some of the one or more data files.

17. The multichannel media distribution system of claim 15, wherein the one or more user interfaces includes one or more of a group that includes a graphical user interface and an Application Programming Interface.

18. The multichannel media distribution system of claim 15, wherein to receive the one or more data files from the remote data server includes to receive the one or more data files from a first remote data server operated by a first entity, and wherein the communication interface is further to receive scheduling information regarding the multiple scheduled presentations from a distinct second remote data server operated by a distinct second entity.

19. The multichannel media distribution system of claim 15, further comprising a media spool manager to provide at least some of the multiple media assets to each of at least some media receiver devices of the plurality of distinct media receiver devices prior to the scheduled presentations of the at least some multiple media assets.

20. The multichannel media distribution system of claim 15, further comprising a database generator to determine, based on the generated one or more database entries, an aggregated success rate associated with each of one or more subsets of the multiple scheduled presentations.

* * * * *